(12) United States Patent
Bishop (10) Patent No.: US 8,630,298 B2
(45) Date of Patent: Jan. 14, 2014

(54) DISPERSED HIGH LEVEL DEVICES IN A NETWORK ENVIRONMENT

(75) Inventor: Donald M. Bishop, Highlands Ranch, CO (US)

(73) Assignee: Sandwave IP, LLC, Loveland, CO (US)

( * ) Notice: Subject to any disclaimer, the term of this patent is extended or adjusted under 35 U.S.C. 154(b) by 471 days.

(21) Appl. No.: 11/150,384

(22) Filed: Jun. 11, 2005

(65) Prior Publication Data

US 2006/0280176 A1 Dec. 14, 2006

(51) Int. Cl.
*H04L 12/28* (2006.01)
*H04J 1/00* (2006.01)

(52) U.S. Cl.
USPC .......................................... 370/401; 370/486

(58) Field of Classification Search
None
See application file for complete search history.

(56) References Cited

U.S. PATENT DOCUMENTS

| | | | |
|---|---|---|---|
| 5,721,819 A | 2/1998 | Galles et al. | |
| 6,085,238 A | 7/2000 | Yuasa et al. | |
| 6,404,764 B1 * | 6/2002 | Jones et al. | 370/352 |
| 6,665,296 B1 | 12/2003 | Sturza et al. | |
| 6,771,673 B1 | 8/2004 | Baum et al. | |
| 6,947,401 B2 * | 9/2005 | El-Malki et al. | 370/331 |
| 7,002,995 B2 * | 2/2006 | Chow et al. | 370/485 |
| 7,072,346 B2 | 7/2006 | Hama | |
| 7,127,524 B1 * | 10/2006 | Renda et al. | 709/245 |
| 7,280,534 B2 | 10/2007 | Koppol | |
| 7,590,144 B1 | 9/2009 | Ladd | |
| 2002/0006137 A1 * | 1/2002 | Rabenko et al. | 370/466 |
| 2002/0105965 A1 | 8/2002 | Dravida et al. | |
| 2002/0138841 A1 | 9/2002 | Ward | |
| 2002/0186699 A1 | 12/2002 | Kwok | |
| 2003/0046706 A1 * | 3/2003 | Rakib | 725/111 |
| 2003/0074670 A1 * | 4/2003 | Penk et al. | 725/96 |
| 2003/0133450 A1 | 7/2003 | Baum | |
| 2003/0219011 A1 * | 11/2003 | Han | 370/352 |
| 2004/0013097 A1 | 1/2004 | Massa | |
| 2004/0019876 A1 | 1/2004 | Dravida et al. | |
| 2004/0090970 A1 * | 5/2004 | Sanchez et al. | 370/397 |
| 2004/0105449 A1 | 6/2004 | Jung et al. | |
| 2004/0107261 A1 * | 6/2004 | Donzis et al. | 709/207 |
| 2004/0114558 A1 * | 6/2004 | Krishnamurthi et al. | 370/338 |
| 2004/0213260 A1 * | 10/2004 | Leung et al. | 370/395.3 |
| 2005/0025143 A1 * | 2/2005 | Chen et al. | 370/389 |
| 2005/0176407 A1 * | 8/2005 | Tuomi et al. | 455/411 |
| 2005/0190757 A1 | 9/2005 | Sajassi | |

(Continued)

OTHER PUBLICATIONS

Craig Kuhl, "Residential Gateways Carve Out Market Niche", CedMagazine.com, Aug. 1, 2000, http://www.cedmagazine.com/residential-gateways-carve-out.aspx, viewed Dec. 22, 2008.

(Continued)

*Primary Examiner* — Eunsook Choi
(74) *Attorney, Agent, or Firm* — Russell S. Krajec; Krajec Patent Offices, LLC (57) ABSTRACT

A system and method for locating Open System Interconnection (OSI) Layer 3 or higher devices at strategic locations throughout the network. The Layer 3 devices may have additional capabilities, such as wireless connections or other functionality that may benefit both the consumer and network provider. Layer 2 traffic is confined to smaller areas, allowing the main backbone of the network to handle more useful data traffic and less overhead traffic.

17 Claims, 7 Drawing Sheets

(56) References Cited

U.S. PATENT DOCUMENTS

| | | | |
|---|---|---|---|
| 2005/0194456 A1* | 9/2005 | Tessier et al. | 236/51 |
| 2005/0232304 A1* | 10/2005 | Quigley | 370/486 |
| 2006/0002369 A1* | 1/2006 | Dowker | 370/351 |
| 2006/0126613 A1* | 6/2006 | Zweig | 370/389 |
| 2006/0133341 A1 | 6/2006 | Chari et al. | |
| 2006/0256799 A1* | 11/2006 | Eng | 370/401 |
| 2008/0151906 A1* | 6/2008 | Kolli et al. | 370/395.31 |

OTHER PUBLICATIONS

"Intelligent Network Interface Device", HomePNA Blog, May 21, 2008, http://homepnablog.typepad.com/my_weblog/2008/05/intelligent-net.html, viewed Dec. 12, 2008.

"Your Connection Point: The Network Interface Device (NID)", www.homephonewiring.com/nid.html, viewed Dec. 22, 2008.

\* cited by examiner

DISPERSED HIGH LEVEL DEVICES IN A NETWORK ENVIRONMENT

BACKGROUND OF THE INVENTION a. Field of the Invention

The present invention pertains generally to communication networks and specifically to network architectures with distributed intelligence.

b. Description of the Background

Cable television and digital subscriber line (DSL) networks are becoming prevalent for delivering data services to businesses and consumer homes. When each customer adds another device on the network, such as information appliances, laptop and desktop computers, television receivers, or other Internet capable devices, the network traffic increases dramatically.

Widely used network architectures have a large central controller, such as a Cable Modem Termination System (CMTS) or Digital Subscriber Line Access Multiplexer (DSLAM) to connect many subscribers to the Internet. The network performance diminishes as the communications load across the distribution backbone increases due in part to protocol overhead, especially with connection establishment and connection maintenance.

It would therefore be advantageous to provide a system and method for providing improved service to subscribers using a given distribution backbone. It would be further advantageous to provide such service without adding substantial complexity or cost to the network

SUMMARY OF THE INVENTION

The present invention overcomes the disadvantages and limitations of previous solutions by providing a system and method for locating high level protocol devices at various places within the network, including at the subscriber connection points. The devices may operate at the Open Systems Interconnection (OSI) layer 3 or higher and manage network traffic at the edge of the network.

The devices may have additional capabilities, such as wireless connections or other functionality that may benefit both the consumer and network provider.

An embodiment of the present invention may include a network comprising: a wide area network connection point device having a connection to the Internet; a distribution backbone connected to the wide area network connection point; a subscriber connection point adapted to maintaining a first table comprising the address of at least one downstream device located distally from the wide area network connection point, the first table being located in the subscriber connection point, the subscriber connection point being located off any subscriber's premises; and a subscriber receiver located within a subscriber's premises.

Another embodiment of the present invention may include a multi-floor building comprising: a messaging distribution backbone spanning several floors; a wide area network connection point connected to the backbone; a plurality of subscriber connection points connected to the backbone, the subscriber connection points adapted to maintain a first table comprising the address of at least one downstream device located distally from the wide area network connection point, the first table being located in the subscriber connection point, the subscriber connection points being located off any subscriber's premises; and a subscriber receiver being located within a subscriber's premises.

Yet another embodiment of the present invention may include a subscriber connection point comprising: a connection to a distribution backbone; at least one connection to a subscriber receiver; an address table; and a processor capable of determining a subscriber device address and storing the address in the address table; wherein the subscriber connection point is located off any subscriber's premises.

Still another embodiment of the present invention may include a method of sending messages through a network comprising: connecting a wide area network connection point to the Internet; connecting the wide area network connection point to a distribution backbone; connecting a subscriber connection point to the distribution backbone at a point distal to the wide area network connection point, the subscriber connection point being located off any subscriber's premises; connecting a subscriber receiver to the subscriber connection point; connecting a subscriber device to the subscriber receiver; sending a query from the subscriber connection point to the subscriber device to determine an address for the subscriber device; sending the address for the subscriber device to the subscriber connection point; storing the address in a first address table located in the subscriber connection point; receiving a message for the subscriber device at the wide area network connection point; transmitting the message from the wide area network connection point to the subscriber connection point based on the address in the second address table; and transmitting the message from the subscriber connection point to the subscriber device based on the address in the first table.

The advantages of the present invention are that lower level traffic is confined to smaller areas, allowing the main backbone of the network to handle more useful data traffic and less overhead traffic. Such a system increases the overall performance of the network.

DETAILED DESCRIPTION OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify the elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there is no intervening elements present.

The present invention may be embodied as devices, systems, methods, and/or computer program products. Accordingly, the present invention may be embodied in hardware and/or in software (including firmware, resident software, micro-code, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), an erasable programmable read-only memory (EPROM or Flash memory), an optical fiber, a portable compact disc read only memory (CD-ROM), and a digital versatile disk read only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Figure 1:
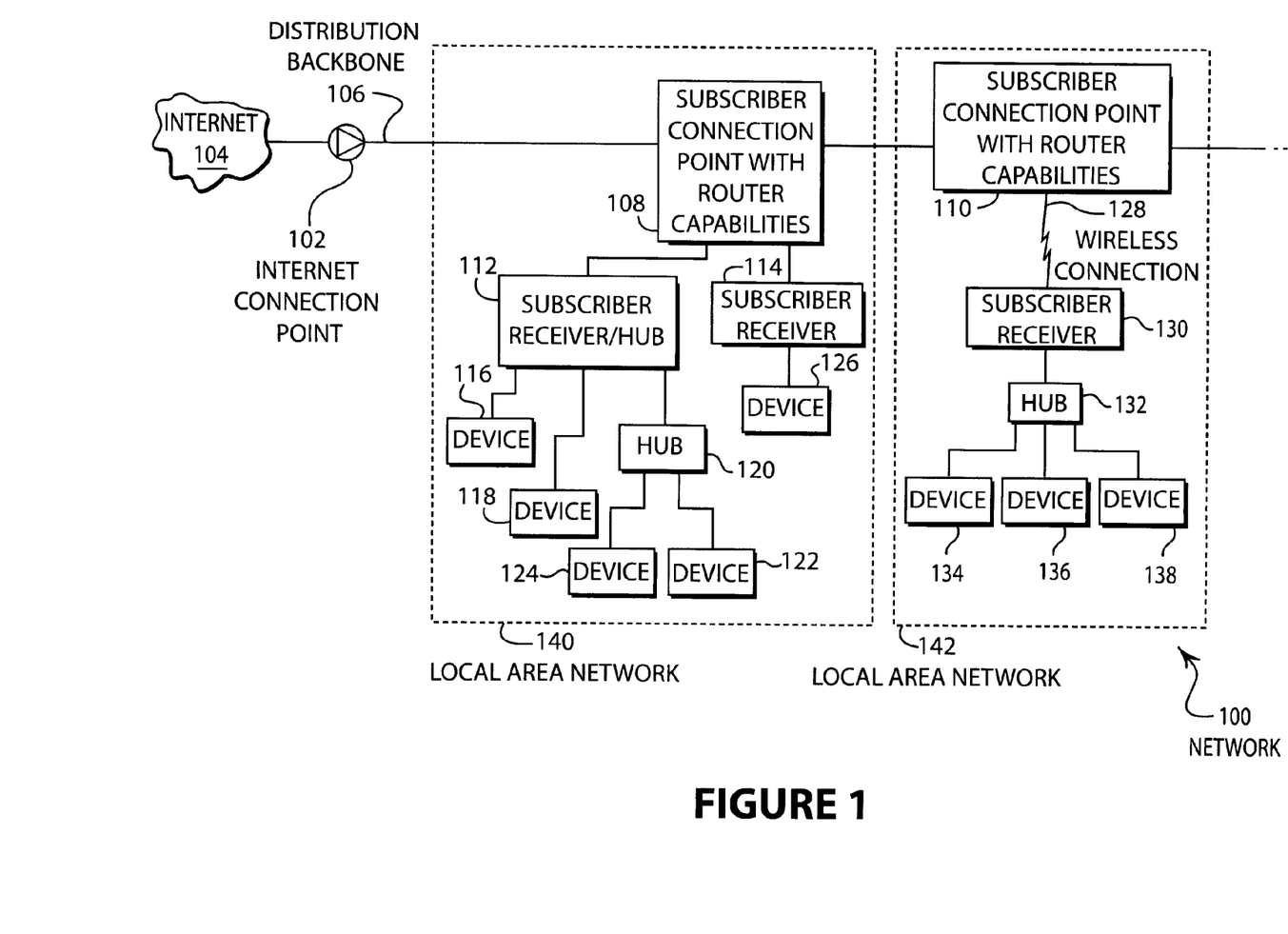
FIG. 1 is a diagrammatic illustration of an embodiment showing a network.

FIG. 1 illustrates an embodiment 100 of the present invention showing a network. The internet connection point 102 is connected to the internet 104 and the distribution backbone 106. Attached to the distribution backbone 106 are subscriber connection points 108 and 110.

Subscriber connection point 108 is connected to subscriber receiver/hub 112 and subscriber receiver 114. Subscriber receiver/hub 112 is attached to devices 116 and 118 as well as hub 120, which is in turn connected to devices 122 and 124. Subscriber receiver 114 is connected to device 126.

Subscriber connection point 110 has a wireless connection 128 to subscriber receiver 130. Subscriber receiver 130 is connected to hub 132, which is connected to devices 134, 136, and 138.

The subscriber connection points 108 and 110 may reduce the traffic on the distribution backbone 106 by minimizing much of the lower level communication traffic from the various devices. The subscriber connection point 108 and 110 may various functionality such as network address translation (NAT), proxy services, IP masquerading, routing, other high level interfaces, and/or information management interfaces. The higher level interfaces at the subscriber connection points 108 and 110 have a number of useful functions, including reducing network traffic. These functions include allocating addresses, buffering or storing cached data remotely, handing various address resolving protocols, and signaling at remote locations throughout the network.

The subscriber connection points 108 and 110 may connect to a single subscriber or may connect to several subscribers. For example, subscriber connection point 108 may connect two different subscribers to the network while subscriber connection point 110 may connect only one subscriber. In some embodiments using a wireless connection, a single subscriber connection point may connect to many subscribers, perhaps hundreds simultaneously.

The internet connection point 102 and the distribution backbone 106 may be any type of network. For example, the distribution backbone 106 may be a fiber optic, wired, or wireless network. An example of a typical network may include a hybrid fiber/coax cable television network wherein the internet connection point is a Cable Modem Termination System (CMTS). Another example may be a twisted pair distribution backbone connected to a Digital Subscriber Line Access Multiplexer (DSLAM) interface to the internet. In some embodiments, the distribution backbone 106 may include wireless connections between the internet connection point 102 and the subscriber connection points 108 and 110. Various network configurations may be possible while keeping within the spirit and intent of the present invention.

The subscriber receivers 112, 114, and 130 may include hardware and software that establishes a connection with a subscriber connection point. In some embodiments, the connection may be established using authentication and verification routines that may include user identification and password, hardware addresses, subscriber account verification, or other security or account verification mechanisms. In some embodiments, the connection verification routine may allow a new subscriber to establish a connection.

The subscriber receivers 112, 114, and 130 may be many different kinds of connections. In some embodiments, a subscriber receiver may be a network interface card (NIC) wired to the subscriber connection point via an Ethernet cable, or they may be modems of various types such as cable modems, DSL modems, or optoelectrical modems using compatible cabling. In other embodiments, the subscriber receiver may be a wireless receiver such as those compatible with the various IEEE 802 wireless protocols, various ultra-wideband protocols, or other wireless communications systems.

The subscriber connection points 108 and 110 may be located outside of a subscriber's premise. For example, a subscriber connection point may be located on a utility pole or in a utility pedestal. In some embodiments, the location of the subscriber connection point may be on a subscriber's property, but within an easement or right of way of the network provider. For example, a cable television distribution network or phone distribution network may mount a subscriber connection point on the exterior of a subscriber's house but may be owned, installed, serviced, and accessed only by the service provider. In such a manner, an individual subscriber would have little ability to access the subscriber connection point.

In a public wireless embodiment, a subscriber connection point may located on an antenna pole, in a coffeeshop, airport lounge, or other public facility. A subscriber may access the network through the antenna. In such an embodiment, and for the purposes of this application, the subscriber's premise may be defined to include, but is not limited to the subscriber's mobile electronic devices directly under the subscriber's control, whether it is a laptop computer, mobile phone, personal digital assistant, subscriber receiver, or any other device in communication with the antenna. A device outside the subscriber's premise includes, but is not limited to, those devices outside of the normal access of the subscriber, such as a connection box owned by a network services provider mounted on a subscriber's dwelling, a utility pedestal or utility pole mounted connection point, an antenna mounted in a public accessible area, or any other area generally considered to be owned, maintained, or controlled by a network service provider.

The subscriber receiver hub 112 may incorporate a hub or switch functionality into the subscriber receiver. Such a device may allow multiple devices, such as computers, internet appliances, telephony devices, or other devices to use the connection to the internet. In other embodiments, the subscriber receiver 130 may include only a single connection which may then be connected to a hub 132 for distribution to several devices 134, 136, and 138.

Figure 2:
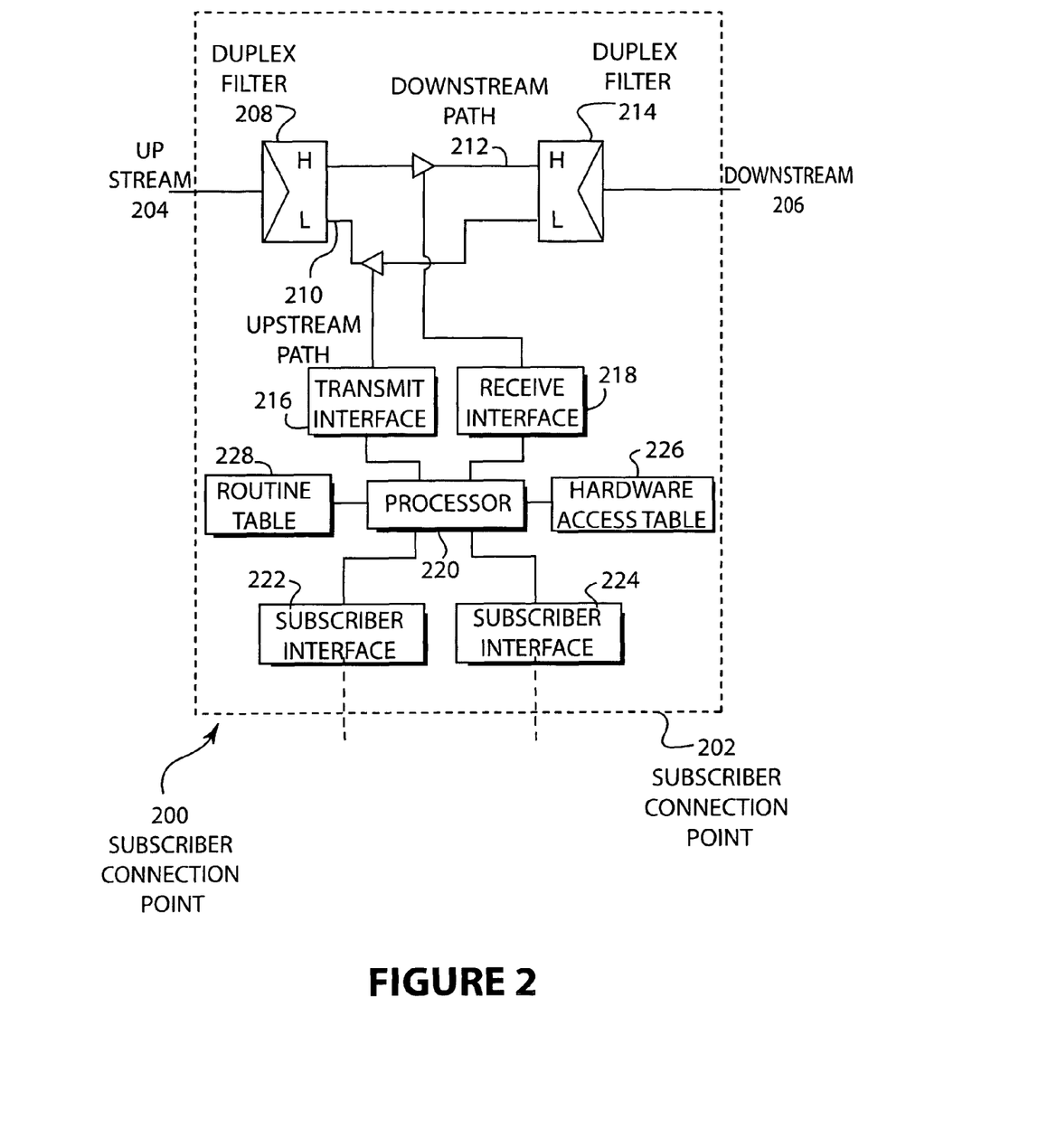
FIG. 2 is a diagrammatic illustration of an embodiment showing a subscriber connection point.

FIG. 2 is a block diagram illustration of an embodiment 200 showing a subscriber connection point. The subscriber connection point 202 is connected to upstream 204 and downstream 206 network connections. A duplex filter 208 separates the incoming connection into an upstream path 210 and downstream path 212. A second duplex filter 214 combines the signals for the downstream connection 206.

The upstream path 210 is connected to a transmit interface 216. Similarly, the downstream path 212 is connected to a receive interface 218. Both the transmit interface 216 and receive interface 218 are connected to the processor 220. The processor 220 is connected to subscriber interfaces 222 and 224. The processor 220 is further connected to a hardware access table 226 and a routing table 228.

The subscriber connection point 202 is an embodiment that may be used in a linear broadband network, such as a cable television network. In such a system, one band of the network may be allocated for downstream communications and another band for upstream communications. In the present embodiment, the high frequency bands are used for downstream communication and the lower frequency bands are used for upstream communications.

The processor 220 maintains and uses the hardware address table 226 to keep track of the various devices that may be connected to the subscriber interfaces 222 and 224. The processor 220 may periodically send queries to all of the devices attached to subscriber interfaces 222 and 224 requesting their hardware addresses. The hardware addresses may be the media access control (MAC) address or Internet Protocol (IP) address of the various devices or some other identifier.

Additionally, the routing table 228 may include addresses of devices located along the upstream 204 or downstream 206 connections to the subscriber connection point 202. The routing table 228 may contain addresses for messages that are to be sent to computers or devices on the internet or located along upstream or downstream connections.

The transmit interface 216 and receive interface 218 may perform various functions associated with transmitting and receiving messages, respectively. These tasks may include handshaking and low level communications, queuing the messages, and any processing of the messages. The transmit interface 216 and receive interface 218 may be embodied in a combination of software, firmware, microcode, field programmable gate arrays, hardware, or other technologies.

Figure 3:
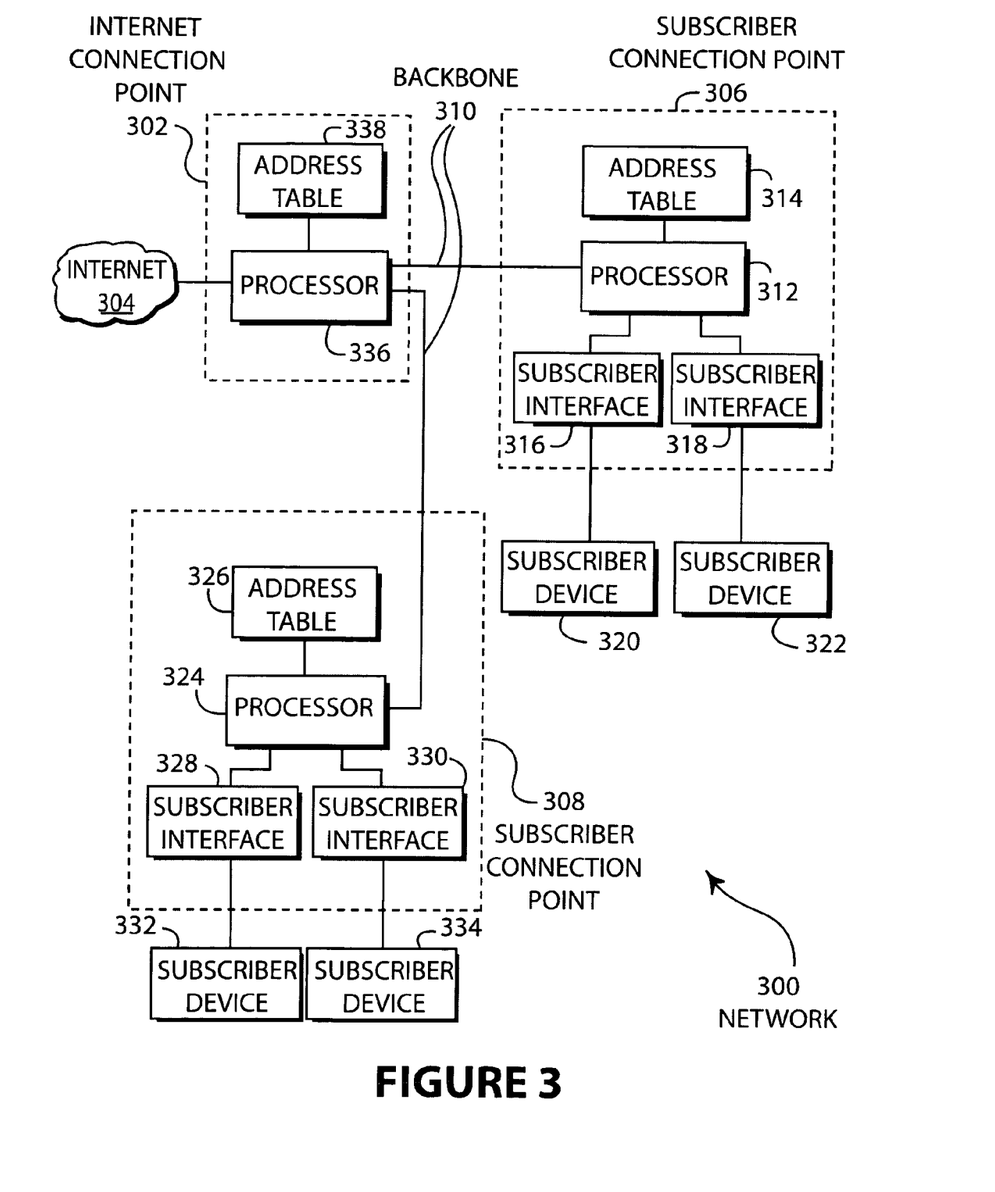
FIG. 3 is a diagrammatic illustration of an embodiment showing a network having address tables.

FIG. 3 is a diagrammatic illustration of an embodiment 300 showing a network having address tables. The internet connection point 302 is connected to the internet 304 and subscriber connection points 306 and 308 through backbone 310. The subscriber connection point 306 comprises a processor 312 that is connected to address table 314 and subscriber interfaces 316 and 318, which are in turn connected to subscriber devices 320 and 322, respectively. Similarly, subscriber connection point 308 comprises processor 324 that is connected to address table 326 and subscriber interfaces 328 and 330. Subscriber interfaces 328 and 330 are connected to subscriber devices 332 and 334, respectively. Internet connection point 302 comprises a processor 336 that is connected to address table 338.

The address tables 314 and 326 located within the subscriber connection points 306 and 308, respectively, may be used to eliminate routine traffic over the backbone 310. The subscriber connection points 306 and 308 may act as managers of local area networks (LANs) that comprise the downstream devices. The address tables 314 and 326 may be used in several different methods. Before explaining the methods, it is necessary to review some concepts of the OSI reference model in common use today.

In the OSI reference model, layer 1 refers to the physical layer and the activities required to communicate over a physical medium. These activities vary for the specific medium and protocol, and may include low level handshaking, acknowledging, checking parity, and other physical actions required to transmit data.

Layer 2 refers to the data link layer and handles to movement of data across the physical layer. Layer 2 contains the media access control (MAC) addresses and logical link control (LLC). Examples of layer 2 include Ethernet and point to point protocol (PPP).

Layer 3 is the network layer and handles the routing of data packets across the network. An example of layer 3 is the Internet Protocol (IP). Layer 3 activities relate to the movement of messages across a network. Each message may contain the IP addresses of the sender and recipient of the message, and the message is passed from one computer to the next until the message reaches its destination.

Layer 4 is the transport layer and coordinates the messages being sent on layer 3. For example, a long data transmission may be broken into small messages. These messages may be transmitted independently and may arrive at the destination in a different order than intended. The layer 4 activities are concerned with placing the messages in the proper order to create the long data transmission. Examples of layer 4 are transmission control protocol (TCP) and user datagram protocol (UDP).

Layer 5 is the session layer and establishes a conversation between two computers. A session may be used for a single transmission or may be used for an extended conversation until one of the hosts terminate the session. In some embodiments, a computer may have a specific port dedicated to a specific type of communication. For example, port or session 80 is often dedicated to hyper text transfer protocol (HTTP) communications.

Layer 6 is the presentation layer and ensures that the data is in the proper form. Layer 6 activities may include checks for data formats, compatibility with the host operating system, encapsulation of the data in appropriate envelopes, or other activities. An examples of a layer 6 device is the HTTP daemon which may receive an HTTP document, check the multipurpose internet mail extension (MIME) header, and launch the appropriate application.

Layer 7 is the application layer and provides services to the application program to ensure an effective communication. Such services include making sure the other party is identified and ready to communicate, authenticate the sender and recipient, ensures agreement on data error recovery, and determining protocol and data syntax rules. Such services are generally the high level set-up services for the application or interactive user.

In various embodiments of the present invention, the address tables 314 and 326 may be used to store several types of address information.

In a layer 3 embodiment of a subscriber connection point, the address tables 314 and 326 may contain the MAC addresses of the subscriber devices. In such an embodiment, the processors 312 and 324 may send periodic queries to the subscriber devices to determine the MAC addresses of the subscriber devices. In many embodiments, such queries may be performed at different intervals, from a fraction of a second to several seconds, to many minutes. Such queries are confined between the processor and the downstream devices and may not be transmitted across the backbone 310. In some embodiments, the process of querying, determining the addresses, and storing the addresses in an address table is known as address resolution protocol (ARP), which is but one embodiment of an address resolving method portion of the present invention.

A layer 3 embodiment may operate as a hub or switch device within the network.

In another layer 3 embodiment of a subscriber connection point, the address tables 314 and 326 may contain the IP addresses of the subscriber device. Such an embodiment may also store the MAC addresses of the subscriber devices in the address tables 314 and 326.

In a layer 4 embodiment of a subscriber connection point, the address tables 314 and 326 may contain the IP addresses of the subscriber device and additionally perform various transport layer functions, such as TCP or UDP functions.

In a layer 5 embodiment of a subscriber connection point, the address tables 314 and 326 may contain a session or port identification. In such an embodiment, IP addresses and/or MAC addresses of downstream devices may be also stored in the address tables 314 and 326.

A layer 5 embodiment may include IP masquerading or network address translation (NAT), which is a process by which all communications from the internet are addressed to the IP address of the subscriber connection point. The communications are relayed to the appropriate subscriber device based on a predetermined session established between the subscriber connection point and the subscriber device. Some NAT embodiments may be one-to-many embodiments where a single address for the subscriber connection point is used to translate for many subscriber devices. Other NAT embodiments may be one-to-one embodiments where each subscriber device has its own IP address.

In some embodiments, the internet connection point's address table 338 may contain some or all of the information contained in the subscriber connection point's address tables 312 and 326. For example, if the IP addresses are uniquely assigned to the subscriber devices, those IP addresses will be maintained within the address tables of the appropriate subscriber connection points. The contents of the address tables 314 and 326 may be periodically transmitted to the internet connection point 302 for updating the address table 338. In this manner, messages that are received at the internet connection point 302 may be compared to the address table 338 to determine if a message should be transmitted to a subscriber connection point.

In other embodiments, the subscriber connection point 306 may comprise a proxy server, and may include such features as caching, firewalling, or other proxy features.

Figure 4:
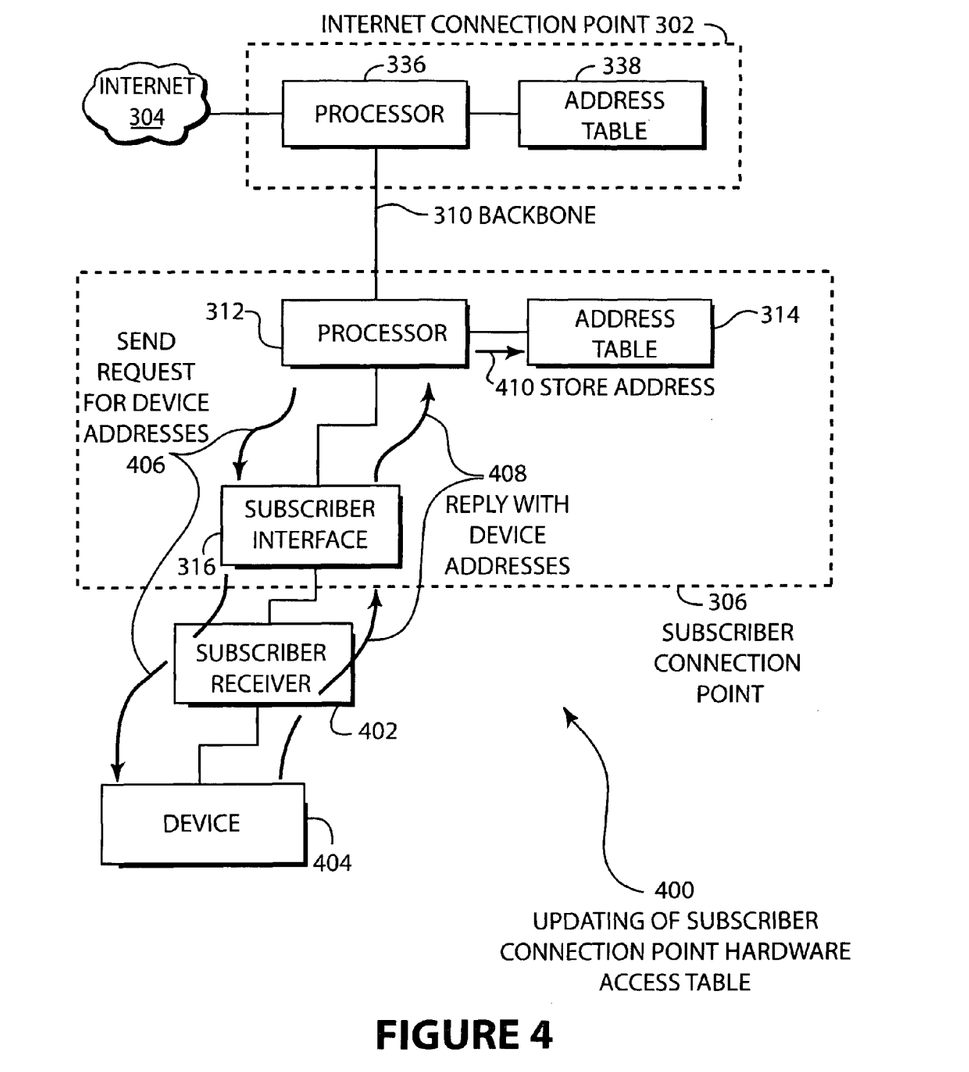
FIG. 4 is a diagrammatic illustration of an embodiment showing message transfers between the subscriber connection point and the subscriber device.

FIG. 4 is a diagrammatic illustration of an embodiment 400 of message transfers between the subscriber connection point and the subscriber device. The subscriber connection point 306 is connected to an internet connection point 302 by backbone 310. The internet connection point 302 has a connection to the internet 302. The internet connection point 302 comprises a processor 336 and address table 338.

The subscriber connection point processor 312 sends a request for addresses 406 to a subscriber interface 316, which passes through the subscriber receiver 402 to reach the device 404. The device 404 replies with its address 408 through the receiver 402 and subscriber interface 316 to reach the processor 312. The processor 312 stores the address 410 into the address table 314.

In the embodiment 400, any address or identifier may be transmitted from the device 404 and stored in the address table 314. Various embodiments may use different addresses or identifiers for the device 404 while keeping within the spirit and intent of the present invention. The embodiment 400 may include transmissions in compliance with an address resolution method.

Figure 5:
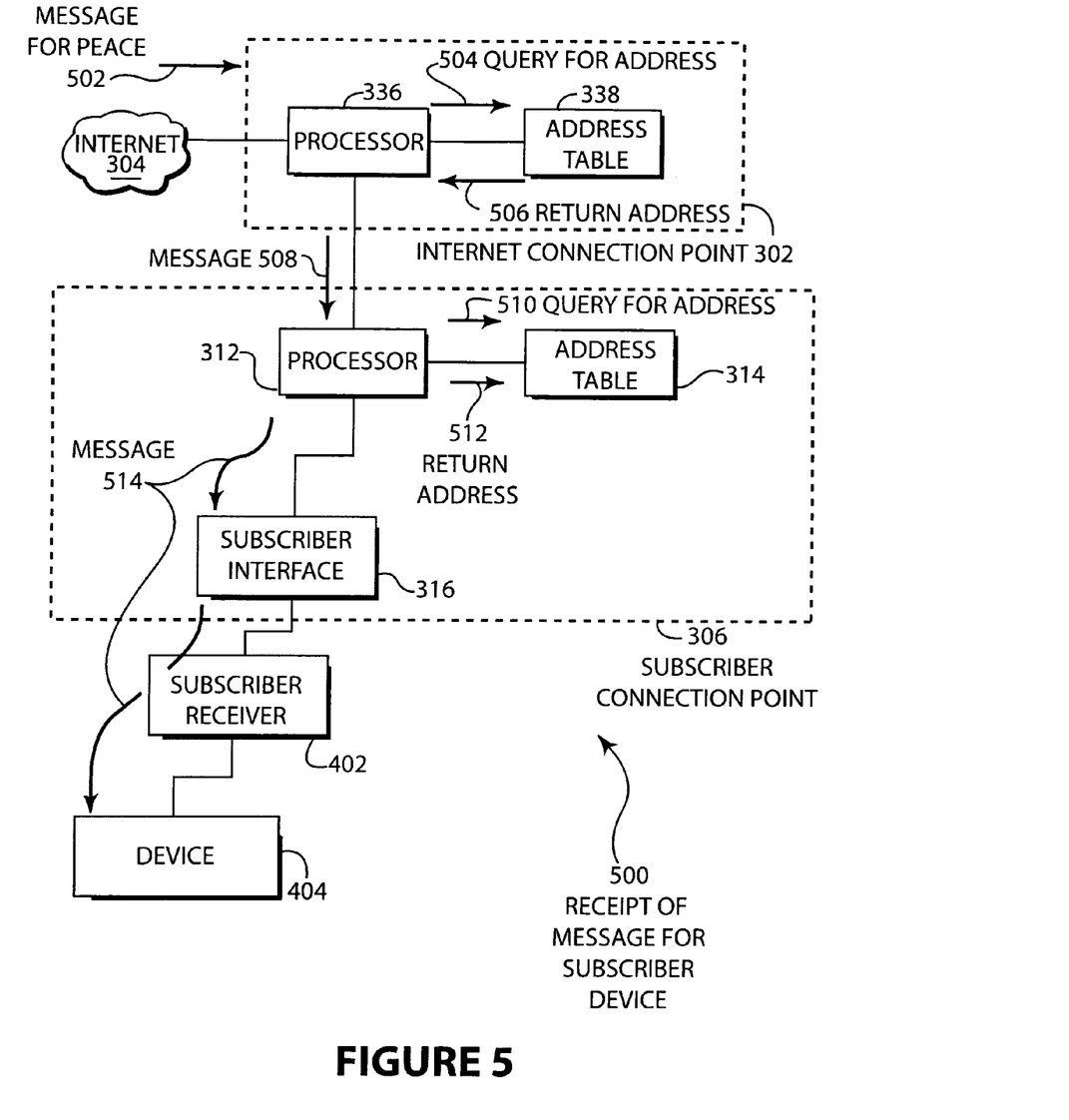
FIG. 5 is a diagrammatic illustration of an embodiment showing a message receipt from the internet.

FIG. 5 is a diagrammatic illustration of an embodiment 500 of a message receipt from the internet. The subscriber connection point 306 is connected to an internet connection point 302 by backbone 310. The internet connection point 302 has a connection to the internet 302. The internet connection point 302 comprises a processor 336 and address table 338.

A message 502 is sent from the internet to the internet connection point 304. The message 502 may contain an address for the destination device 404. After receiving the message 502, the processor 336 may send a query 504 to the address table 338 to return an address 506. Based on the address 506, the message 508 is transmitted to the subscriber connection point 306. The processor 312 sends a query 510 to the address table 314, which returns an address 512. The processor 312, using the address 512, transmits the message 514 to the subscriber interface 316, through the subscriber receiver 402, and to the device 404.

Because the subscriber connection point 306 maintains the address table 314 comprising the addresses of downstream devices, much of the communication across the network backbone is reduced. Much of the repetitious querying of devices on the local network is confined between the subscriber connection point and the subscriber devices. This overhead traffic, which would otherwise burden the network backbone, is restricted to a local area. Since the network is less burdened with overhead traffic, more subscribers may connect to the network with comparable service than if the subscriber connection points did not handle such overhead traffic.

The subscriber connection point 306 may be owned and controlled by the same company that owns the network backbone. In some embodiments, a single subscriber connection point 306 may connect to several different subscribers, each having one or more devices. When the subscriber connection point is owned and controlled by the same company as the network backbone, the network service provider may optimize the functions of the subscriber connection point 306 to provide optimum service.

For example, the subscriber connection point 306 may invoke an address resolving method on a frequent basis, such as every few seconds, but similar queries from the internet connection point 304 to the various subscriber connection points may be performed much less frequently. In some embodiments, the address resolving method queries from the internet connection point 304 may be performed on a manually requested basis so that the address table 338 may be updated on command when changes are made to a downstream subscriber connection point.

In some embodiments, the subscriber connection point 306 may transmit the addresses contained in the address table 314 to the internet connection point 304 only when the data in the address table 314 has changed. For example, during normal operation, the internet connection point address table 338 may contain IP or other addresses of each downstream subscriber connection point and may contain IP or other addresses of all or some of the downstream subscriber devices. If a subscriber device were brought online and have an IP or other address, the normal address resolving method queries similar to those shown in FIG. 4 would detect the device and update the address table 314. When the address table 314 was updated, the processor 312 may be capable of sending a message to the internet connection point 304 so that the address table 338 may be updated.

Figure 6:
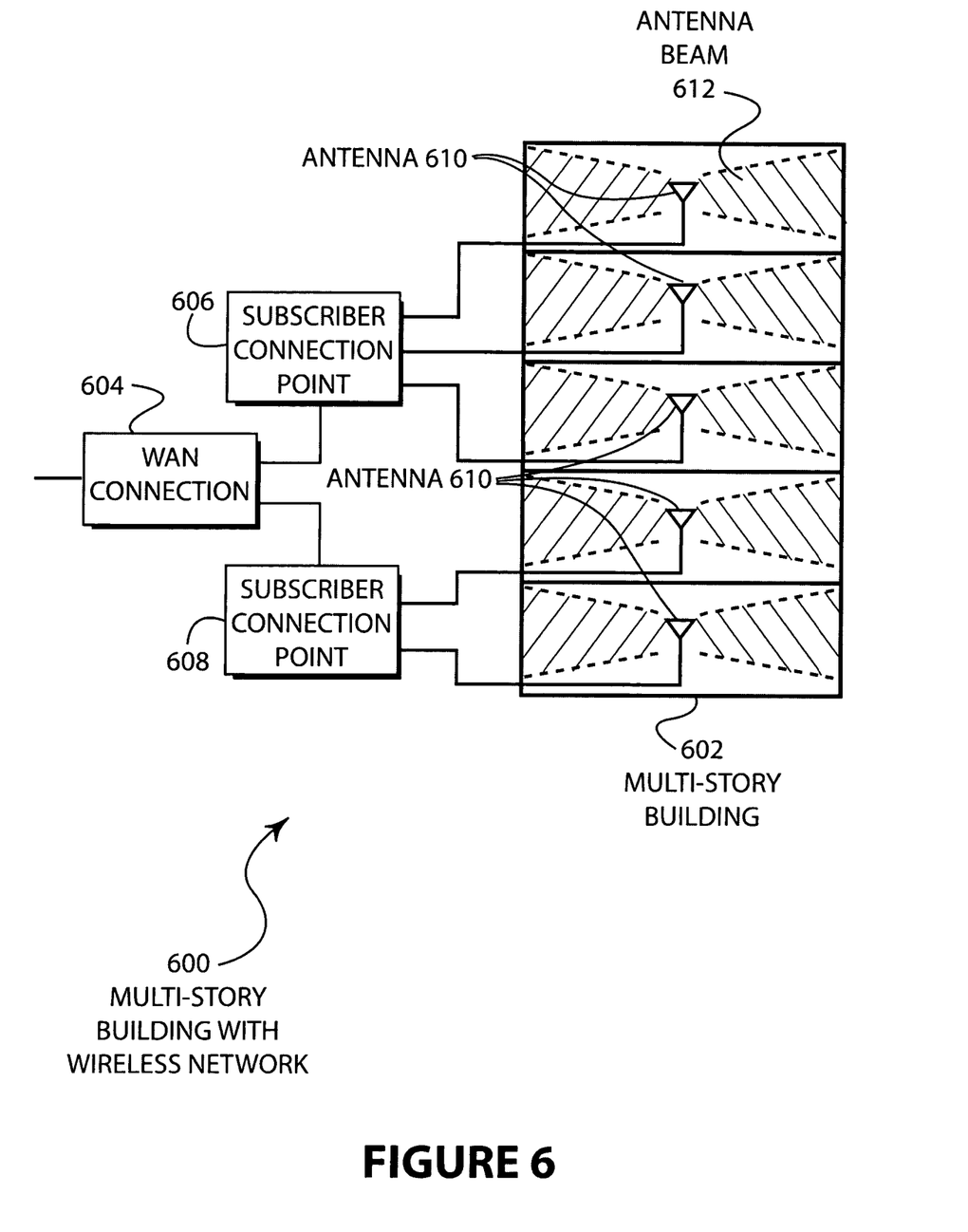
FIG. 6 is a diagrammatic illustration of an embodiment showing a multistory building having a wireless network service.

FIG. 6 is a diagrammatic illustration of an embodiment 600 showing a multistory building having a wireless network service. The multistory building 602 is connected to a wide area network (WAN) 604 through subscriber connection points 606 and 608. The antennas 610 are located on different floors of the building 602 and each have a focused antenna beam 612.

The antennas 610 may be designed and mounted so that the antenna beams 612 cover a portion of the building. In some embodiments, the antennas 610 may be adapted to cover a single floor of the building. For example, a single floor may have several apartments, condominiums, or hotel rooms. In such an example, each unit may be serviced by the antenna mounted on that floor. In other embodiments, antennas may be adapted to serve two or more floors of a building.

The embodiment 600 may allow a service provider to offer internet, telephony, cable television, or other communications to several subscribers with a minimum of installation cost. Each subscriber connection point 606 may serve several floors of a building and enable access to many subscribers. A subscriber may use a wireless receiver to communicate to the appropriate subscriber connection point. In some embodiments, IEEE 802.11 standards may be used for the wireless transmissions while in other embodiments, specialized protocols may be used.

In some embodiments, the WAN connection 604 may be a connection to the internet or may be a connection to a network such as a hybrid fiber/coax cable television network or other type of connection. In some embodiments, the multistory building 602 may be a single building on a business campus and the WAN connection 604 may be a connection to the company's wide area network.

Figure 7:
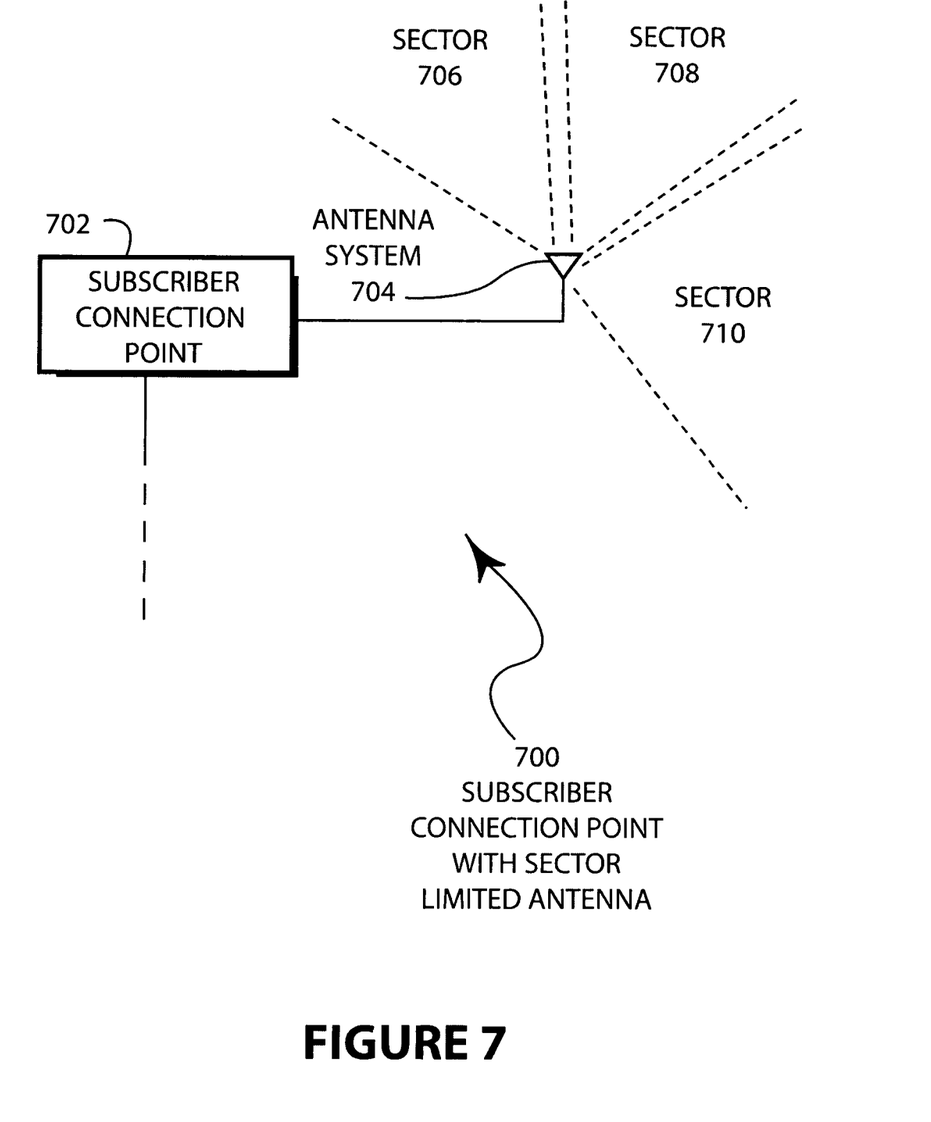
FIG. 7 is a plan diagram of an embodiment showing a subscriber connection point with sector directed antennas.

FIG. 7 illustrates a plan diagram of an embodiment 700 showing a subscriber connection point with sector directed antennas. The subscriber connection point 702 is connected to an antenna system 704 that broadcasts in several distinct sectors 706, 708, and 710.

The antenna system 704 may comprise one or more antennas that have a focused coverage area. Several such areas may be useful when many subscribers attempt to access the subscriber connection point 702, since the subscribers may be separated into separate sectors.

The embodiment 700 may be particularly useful when deployed in an area such as a store, park, airport, stadium, or other venue where many subscribers may wish to communicate with the subscriber connection point 702. Because the subscriber connection point 702 may handle much of the functionality such as address resolving requests, IP masquerading, network address translations, proxy services, and other functions, such data need not travel over the network backbone and use other resources for such purposes. By distributing various functionality downstream from the headend equipment, such as a CMTS or DSLAM, more data and more subscribers can be serviced with the same network backbone.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A network comprising:
a network connection point device having a connection to the Internet, said network connection point having a first table comprising the address of at least one subscriber connection point;
a bi-directional distribution backbone connected to said network connection point;
a subscriber connection point configured to maintain a second table comprising the address of at least one downstream device located distally from said network connection point and comprising a second subscriber connection point, said second table being located in said subscriber connection point, said subscriber connection point being located off any subscriber's premises and in a location physically accessible to a network operator but not a subscriber, said first table and said second table being used at least in part for Network Address Translation.

2. The network of claim 1 wherein said distribution backbone is a linear broadband network.

3. The network of claim 1 wherein said distribution backbone comprises a plurality of twisted pair conductors.

4. The network of claim 1 wherein said network connection point device is a cable modem termination system.

5. The network of claim 1 wherein said network connection point device is a digital subscriber line access manager.

6. The network of claim 1 wherein said network connection point is configured to maintain a third table comprising said address of at least one downstream device, said third table being located in said network connection point.

7. The network of claim 6 wherein said third table further comprises an address of at least one device on the Internet.

8. The network of claim 1 wherein said network connection point comprises a router operating at OSI Layer 3 or higher.

9. The network of claim 1 wherein said subscriber connection point comprises a router operating at OSI Layer 3 or higher.

10. The network of claim 1 wherein said at least one downstream device is connected to said subscriber connection point using a wireless connection.

11. The subscriber connection point of claim 1 wherein said at least one connection to a subscriber receiver is a wireless connection.

12. The network of claim 1, said location being a utility pole.

13. The network of claim 1, said location being a utility pedestal.

14. The network of claim 1, said location being located within a easement.

15. The network of claim 1, said location being a network interface device.

16. The network of claim 1, said subscriber connection point being mounted on an exterior of a subscriber's house and physically accessible only by said network operator.

17. The network of claim 1, said subscriber connection point being configured to provide IP masquerading using said first table.

* * * * *